US007984441B2

(12) United States Patent
Briccarello et al.

(10) Patent No.: US 7,984,441 B2
(45) Date of Patent: Jul. 19, 2011

(54) METHOD AND SYSTEM FOR TUNING A TASKSCHEDULING PROCESS

(75) Inventors: Paolo Briccarello, Turin (IT); Roberta Carlucci, Turin (IT); Giovanna Sacchi, Turin (IT)

(73) Assignee: Telecom Italia S.p.A., Milan (IT)

( * ) Notice: Subject to any disclaimer, the term of this patent is extended or adjusted under 35 U.S.C. 154(b) by 1359 days.

(21) Appl. No.: 10/573,829

(22) PCT Filed: Sep. 30, 2003

(86) PCT No.: PCT/EP03/10814
§ 371 (c)(1),
(2), (4) Date: Mar. 29, 2006

(87) PCT Pub. No.: WO2005/041077
PCT Pub. Date: May 6, 2005

(65) Prior Publication Data
US 2007/0039001 A1 Feb. 15, 2007

(51) Int. Cl.
*G06F 9/46* (2006.01)
(52) U.S. Cl. ...................... 718/102; 718/104
(58) Field of Classification Search .................. 718/102, 718/104
See application file for complete search history.

(56) References Cited

U.S. PATENT DOCUMENTS

| 4,744,028 A | 5/1988 | Karmarkar |
| 5,444,632 A | 8/1995 | Kline et al. |
| 6,275,812 B1 * | 8/2001 | Haq et al. ........................ 705/11 |
| 6,278,978 B1 * | 8/2001 | Andre et al. ...................... 705/9 |
| 6,389,400 B1 * | 5/2002 | Bushey et al. .................... 705/7 |
| 6,578,005 B1 * | 6/2003 | Lesaint et al. .................... 705/8 |
| 2003/0014293 A1 | 1/2003 | Shetty et al. |
| 2003/0055705 A1 * | 3/2003 | Kilpatrick ........................ 705/9 |

FOREIGN PATENT DOCUMENTS

| EP | 0 400 789 | 12/1990 |
| EP | 1 139 248 A1 | 10/2001 |
| WO | WO-01/25991 A1 | 4/2001 |

* cited by examiner

*Primary Examiner* — Kenneth Tang
(74) *Attorney, Agent, or Firm* — Finnegan, Henderson, Farabow, Garrett & Dunner, L.L.P.

(57) ABSTRACT

A method of tuning a task scheduling algorithm for assigning tasks to resources of a workforce management system, the scheduling algorithm being arranged for calculating a work plan on the basis of resources availability and tasks to be carried out by the resources and as a function of predetermined scheduling parameters. The method includes selectively modifying at least a predetermined subset of scheduling parameters; running the scheduling algorithm on the basis of the parameters, resource and task data for each modified subset of parameters to calculate respective work plans; applying a score function to each of said work plans for calculating respective score values representative of the degree of achievement of one or more targets by each work plan; and selecting the work plan to be used by the workforce management system as the work plan being attributed a score value complying with a predetermined selection criterion, i.e., a highest score. A system and a computer program or computer program set to be run on the system arranged to carry out the method.

21 Claims, 2 Drawing Sheets

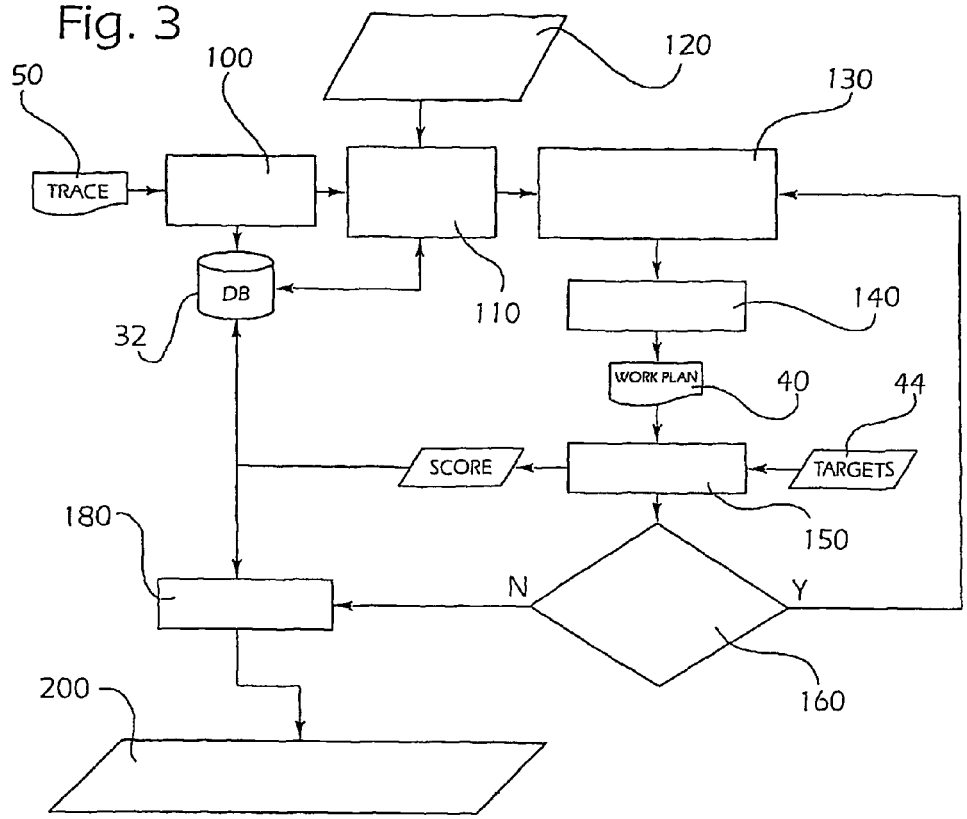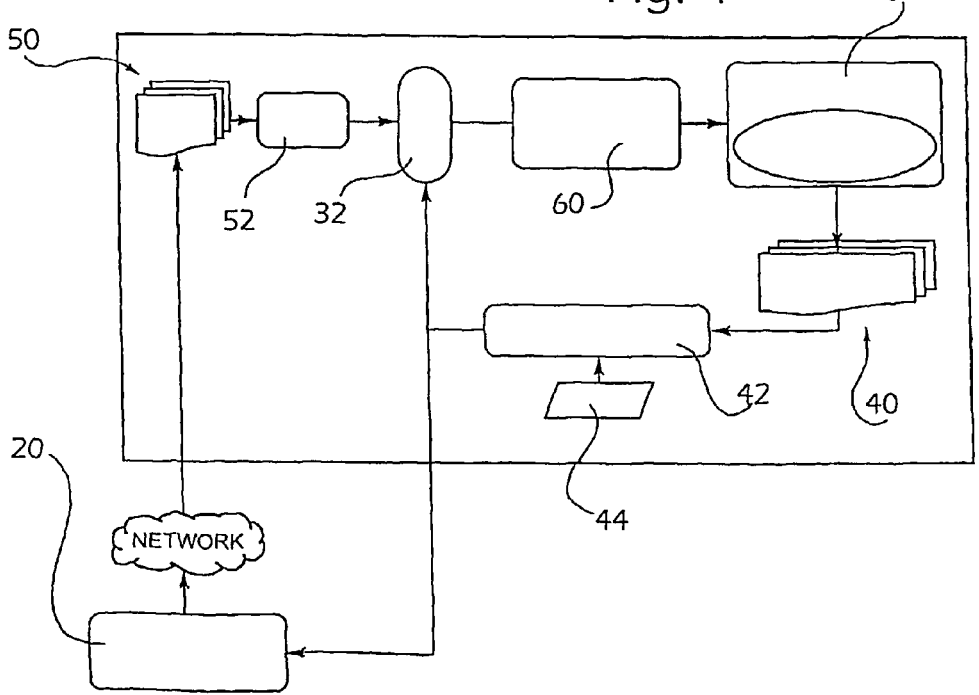

METHOD AND SYSTEM FOR TUNING A TASKSCHEDULING PROCESS

CROSS REFERENCE TO RELATED APPLICATION

This application is a national phase application based on PCT/EP2003/010814, filed Sep. 30, 2003, the content of which is incorporated herein by reference.

FIELD OF THE INVENTION

This invention generally relates to scheduling processes or algorithms for assigning tasks to resources of a workforce management system, and specifically to a method and system for tuning a scheduling process for assigning tasks to resources of a workforce management system, e.g. in a telecommunications network.

BACKGROUND OF THE INVENTION

In telecommunications systems extending over a wide area, installation or repair work on the network is managed via Work Requests (WRs) and is allocated to technicians (resources) who are dispatched to provide, repair or maintain telecom equipments located at customer premises, or elsewhere in the network.

WorkForce Management (WFM) tools or systems, on the basis of the incoming WRs, run scheduling algorithms to define a work plan comprising for example, for each request, information as to the execution time, the technicians (one or more) to whom the task is assigned, the vehicle for outdoor tasks and the spare parts of probable use.

In doing this, it is necessary to optimise a set of hard and soft constraints like resource availability, distances to be travelled, tasks priorities, technicians skills and human workload balancing, to name but a few. Furthermore, the results of the scheduling process depend on a plurality of parameters (several tens) concerning process conditions.

WO 01/25991 describes a scheduling algorithm for assignment of tasks to resources in a WorkForce Management system. The scheduling process is controlled by a specified set of parameters, for example the number of tasks assigned to a set of resources, the total weight of the assigned tasks as determined by, e.g., the priorities of the assigned tasks, the total duration of the assigned tasks, the number of tasks that are assigned to preferred resources as determined by, e.g., the qualifications of the resources, the number of deadlines missed because of unassigned tasks and/or the total travel time for dispatching a resource to perform an assigned task.

Although WorkForce Management systems, as for example the above reported system, have reduced the difficulty for telecommunication operators in scheduling and dispatching their technicians, the systems and algorithms employed are generally difficult to customize or reconfigure to the needs of a particular organization.

In EP 1 139 248, a solution is described that allows the selective modification of a scheduling process.

Tasks that are to be performed by field engineers or technicians are scheduled by running a scheduler at a server under a predetermined reference set of process conditions to provide schedule data corresponding to schedules of the tasks that the individual technicians are to carry out. Inputs to obtain schedule data are task data concerning the tasks to be carried out and resource data concerning characteristics of the technicians available to carry out the tasks over a given period.

The above scheduling process utilises a scheduling algorithm wherein process modalities are set as a function of the values of a plurality of scheduler parameters.

According to the above document, what-if analysis can be performed by an operator, for optimising management of the scheduling algorithm. The process conditions for the scheduler can be selectively modified by the operator and the resulting modified schedule data can be displayed and analysed to determine if the scheduling can be improved by changing said conditions. The modification of the process conditions includes, for example, changing parameters data and engineers data by the operator.

Applicant remarks that the newly calculated work plans are estimated by the operator, i.e. in a subjective way, by empirically analysing a set of statistics of the work plans calculated by the scheduler.

Applicant remarks that an objective criterion to evaluate a new work plan doesn't exist: a work plan could be good, in order to achieve one or more targets, but unsuitable for others.

By the way, the number of parameters controlling the work modalities of the scheduler is so high that it is impossible to exactly predict its behaviour, in presence of a specific parameters configuration.

SUMMARY OF THE INVENTION

The present invention seeks to improve upon known solutions giving an objective criterion to evaluate newly calculated work plans in a what-if analysis, in order to optimise management of a given scheduling process.

According to the invention, this object is achieved by means of a method and system of tuning a scheduling process having the characteristics defined in independent Claims.

Another object of the invention is a computer program product or computer program set to be run on a computer system or computer network, as claimed.

Reference to "computer program set" is evidently intended to highlight the possibility for the invention to be carried out in a decentralized manner over a plurality of machines.

A preferred embodiment of the invention provides a method and system for defining targets for work plans generated by the scheduling process and for applying a score function to each of the work plans with the aim of calculating respective score values representative of an objective degree of achievement of the targets.

BRIEF DESCRIPTION OF THE DRAWINGS

Further characteristics and advantages of the invention will be understood by means of the following detailed description of an embodiment thereof, provided by way of non-limiting example with reference to the appended drawings, in which:

FIG. 3 is a flow chart of a what-if analysis process according to the invention; and FIG. 4 is a block diagram of a alternative what-if analysis environment according to the invention.

DETAILED DESCRIPTION OF A PREFERRED EMBODIMENT

Figure 1:
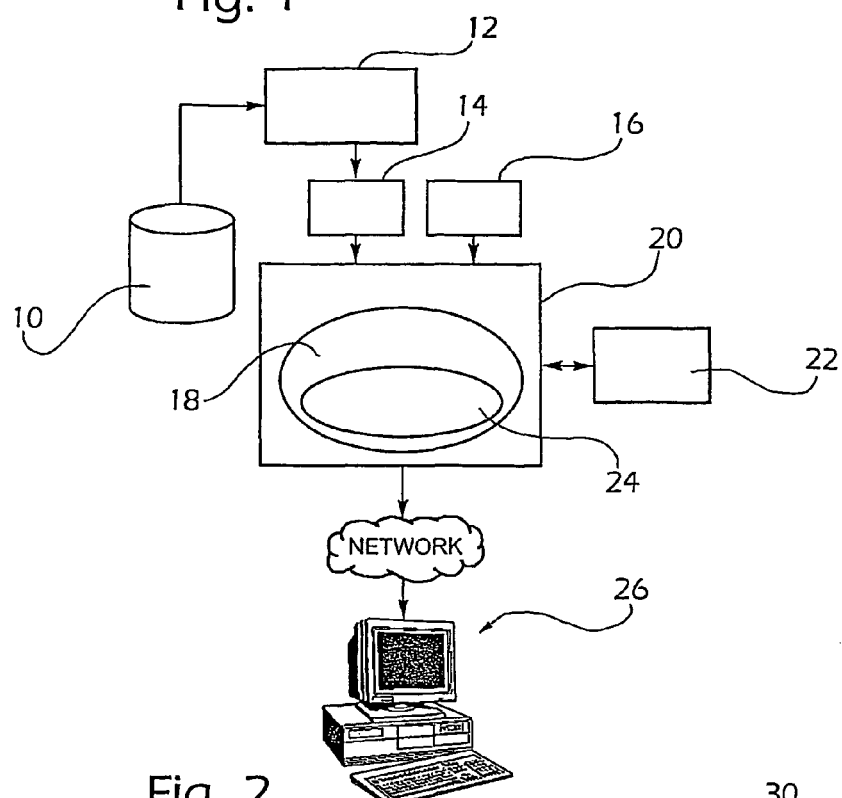
FIG. 1 is a schematic block diagram representing the overview of a typical WorkForce Management System.

Referring to FIG. 1, a telecommunications system 10 is linked to a fault monitoring system 12 which identifies works to be carried out on the system. The fault monitoring system produces a list of tasks 14 to be carried out by resources (technicians), such as field engineers 16.

Tasks are scheduled by running a scheduling process or algorithm within a scheduler 18 at a work manager server 20, under a predetermined reference set of process conditions. As a result, a work plan or schedule data 22 is output by scheduler 18 in order to be supplied to the available technicians.

Work modalities of the scheduler depend on the value of a plurality of parameters data or values (parameters) 24. The modification of the process conditions includes changing parameters data and engineers data.

What-if analysis is carried out within a workstation 26 where the calculated work plans can be displayed and analysed by operators.

The workstation 26 can be connected to the work manager server 20 either through a network, as reported in FIG. 1, or directly.

Figure 2:
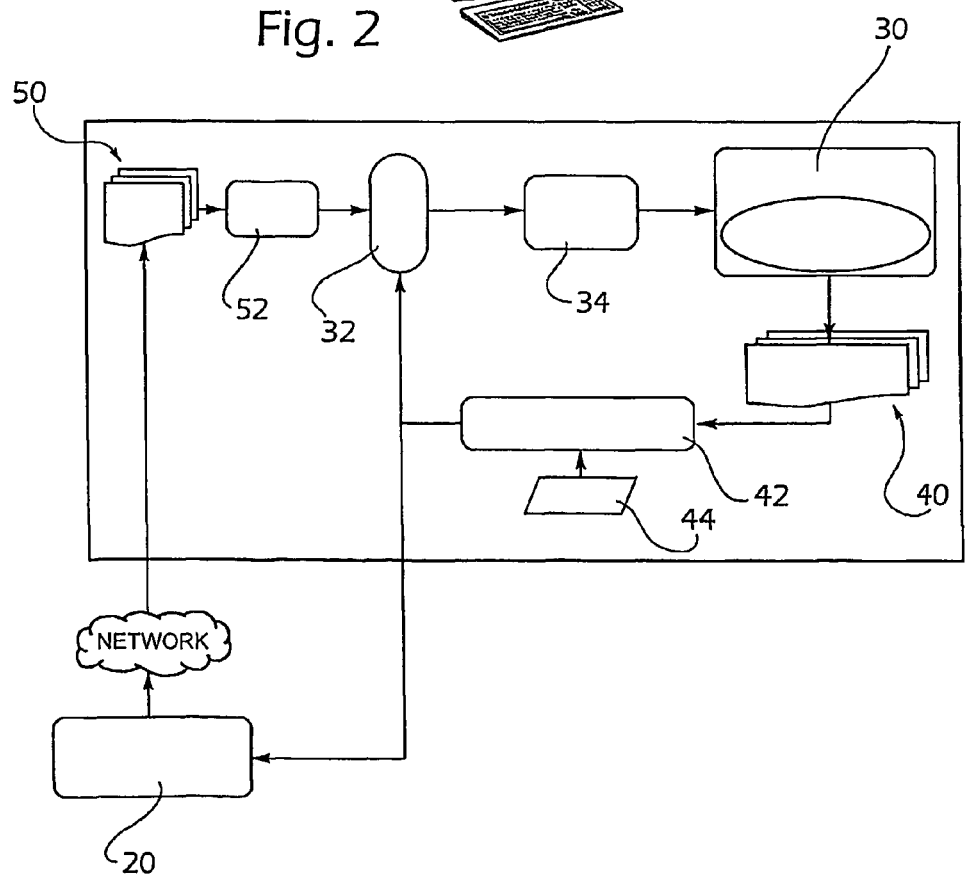
FIG. 2 is a block diagram of a what-if analysis environment according to the invention.

Referring to the diagram of FIG. 2, the system for tuning a task scheduling algorithm according to the invention, implementing the what-if analysis within the workstation 26, is shown.

By way of example, this systems comprises a PC Pentium III 800 MHz with 256 MB RAM, 200 MB available on Hard Disk, Windows 2000/NT 4/XP Professional, NET Framework 1.1, Access 2000, but a man skilled in art will appreciate that any other equivalent or higher hardware and software configuration is possible.

The system includes memory modules for storing data concerning parameters 24, resources availability and the list of tasks to be carried out; and a processing module for running a predetermined scheduling algorithm. A user input/output interface allows an operator to interact with the system. A score module is provided for implementation of a score function for evaluating work plan as calculated by the scheduling algorithm.

It will be appreciated that multiple memory modules may be replaced by a single memory module storing the same information in different regions, without thus departing from the scope of the invention.

Furthermore, it should be understood that the computer system referred to may be a distributed system wherein different components, modules and devices may be located at different sites, being coupled together in a network (LAN, MAN, WAN) by way of communications lines.

The system performs tuning of a task scheduling process based on a plurality of computer program modules implemented in order to carry out the method in accordance with the invention. The modules are arranged to replicate operation of the scheduler 18 allowing modification of the parameters 24 by the operator and to provide an objective criterion (a "Score function") in order to evaluate and compare several calculated work plans, as a function of a "List of targets" which a calculated work plan should achieve. The Score function is used to estimate the level of achievement of targets input in the list.

A scheduling module 30 is implemented as a copy of the scheduler 18 running on the work manager server 20, and receives data relating to tasks (Work Requests, WRs) (14), available technicians (16) and parameters data or values 24 from a database 32, through an Algorithm Allocation Analyser (ALAN) module 34.

The ALAN module 34 interacts with the scheduling module 30 requiring multiple executions related to different combinations of parameters 24. It provides a user-interface to the operator performing the what-if analysis for input by the operator itself of values for a defined subset of parameters or for modification of the stored values of parameters, in a specified range. For all other parameters, as well as for any information on WRs, skills and availability of technicians, the ALAN module retrieves the information stored in database 32.

The work plans produced by the WorkForce Management (WFM) algorithm (one for each combination of parameters or parameters configuration) are indicated by reference numeral 40.

A Score function module 42, implementing a Score function as will be clear in the following, is arranged for receiving in input Statistics data (statistics), i.e. a subset of work plan data deduced by the work plans themselves, and Target data (targets) 44 to be achieved by means of work plans; The score function module 42 is arranged for calculating a "Score" value (score) for any work plan, indicating the level of achievement of the desired targets.

The parameters configuration that generates the work plan with the best score is uploaded on the Work Manager Server 20 and possibly displayed to the operator together with the results of the evaluation of all calculated work plans.

The Work Manager Server 20, based on its scheduling algorithm, e.g. the scheduling algorithm disclosed in WO 01/25991, produces, at any execution of the scheduling algorithm, a trace file.

Trace files 50 contain, amongst others, information about:
parameters configuration controlling the work modalities of scheduling algorithm, for example:
the Previous_day_missed_flag, which is a flag used by the algorithm to decide whether to take in account WRs expired in the previous days or not;
the Asap_premium_boost parameter, which specifies the amount of weight that the algorithm has to add to WRs expired related to activity for business customers;
the Trigger_dispatch_time parameter, which defines the maximum number of minutes of travel time that is allowed in order for a job to be assigned to a currently dispatched or assigned technician; if no currently dispatched or assigned technicians meet the travel time constraint, the job is assigned to a technician at a starting location who has no work yet;
the Assign_last_job_flag, which is a flag used by the algorithm to assign technicians jobs that exceed their original schedule end time;
Work Requests (i.e.: estimated duration, priority, job type, etc.);
skills and availability of technicians.

A Parser module 52 extracts information about WRs, technicians and parameters values from trace files 50 and uploads Database 32, in order to prepare an up-to-date environment for the What-if Analysis.

A flow chart of the what-if analysis process in shown in FIG. 3.

A parser module 52 at step 100 extracts information from available trace files 50 and uploads database 32.

At step 110 the ALAN module 34 retrieves parameter data and information on WRs, skills and availability of technicians from database 32 and/or from parser module 52, and asks for ranges of values for each parameter of a predetermined subset of parameters to be modified, which are to be considered in task scheduling.

An operator inputs (step 120) the requested ranges of values for the predetermined subset of parameters, for example by filling in a parameter editor window displayed at workstation 26.

Subsequently (step 130), ALAN module 34 provides to the scheduling module 30 first parameters configuration values and requires execution of the scheduling algorithm.

Scheduling module 30 runs the scheduling algorithm at step 140 and generates a first work plan corresponding to said first parameters configuration values. The calculated work plan is fed to the score function module 42, and the module calculates a score value relative to said work plan at step 150, based on targets defined in input by the operator, for example by filling in a target editor window displayed at workstation 26.

At step 160 the process verifies whether there are some other parameters configurations deriving from the combination of ranges of values assigned to the subset of parameters, and if this is the case it returns to step 130 where ALAN module 34 provides to scheduling module 30 second parameters configuration values and requires execution of the scheduling algorithm.

Therefore, scheduling module 30 runs again the scheduling algorithm at step 140 and generates a second work plan corresponding to said second parameters configuration values. The calculated work plan is again fed to the score function module 42, and the module calculates a score value relative to said work plan, based on the same targets of the previous cycle.

The loop is run for each parameters configuration input by the operator, then the process exits the loop to display a list of calculated scores (step 180). Thus, the operator may select as preferred parameters configuration the parameters configuration that generates the work plan with the best score, and upload it on the Work Manager Server 20 at step 200, as previously described.

In the following, operation of the Score Function module 42 is described in detail.

A score function is defined for evaluating several work plans by calculating the degree of achievement of a desired target specified in input.

Targets 44 that a work plan must achieve may, for example, be defined as follows:
(1) respecting appointments arranged with customers;
(2) increasing the volume of WRs assigned for different activity types and services;
(3) increasing the volume of backlog WRs assigned for different activity types and services;
(4) balancing the workload between engineers;
(5) optimising travel time;
(6) achieving Service Level Agreement (SLA) for different activity types and services;
(7) assigning WRs to the most appropriate (in terms of skills) technician.

The following Statistics for any work plan calculated by the scheduling module 30 may, for example, be defined:
statistics concerning technicians:
(A) number of technicians employed by the scheduling;
(B) total idle time;
(C) total travelling time;
(D) total number of available technicians;
(E) total working time; etc.
statistics concerning WRs:
(F) total number of WRs assigned to technicians by the algorithm;
(G) total number of WRs with appointment assigned to technicians by the algorithm;
(H) total number of WRs with higher priority assigned to technicians by the algorithm;
(I) number of WRs assigned to technicians by the algorithm for different type of activities and services;
(J) total number of WRs: the number of WRs that the algorithm should assign. This number includes all WRs in "pending" state that the algorithm could assign;
etc.

The "Score function" is a function of a subset of statistics A, ..., Z—at least one—defined above, and may be indicated by general formula:

$$Score = f(A, B, C, \ldots, G, \ldots)$$

where f: Statistics x ... x Statistics→{N:0 ... 100}, and the subset of statistics used depends on the targets 1, ..., n defined above, each statistic being also a function of process conditions or parameters.

In general terms, the score function is mathematically defined as a function operating on at least a statistic, and more generally on a subset of statistics, and associating thereto an absolute integer value belonging to a predetermined limited range of values (typically 0 to 100), wherein a first end (typically the lower limit) represents a condition of maximum deviation from target, and the second end (typically the upper limit) represents a condition of target substantially achieved.

In a currently preferred embodiment, the score function operates on a Cartesian set of statistics by comparing a first numerical value associated with a first statistic or a first subset of statistics with at least a second numerical value associated with a second statistic or a second subset of statistics, according to a predefined relationship depending on the target which form the basis of the evaluation of the scheduling algorithm. The score result is comprised within a range of values (0-100) extending from a lower limit corresponding to a condition of greatest distance between said first and second numerical value, which is associated with a condition of maximum deviation from target, to an upper limit corresponding to a condition of smallest distance or coincidence between said first and second numerical value, meaning that the target has been substantially achieved.

As an example, for target (2), i.e. for increasing the volume of WRs assigned for different activity types and services, the score function is:

$$Score = f_2(J,H)$$

a preferred mathematical relationship being:

$$Score = INT\left(\frac{H}{J}\right) \cdot 100$$

for target 4, i.e. for balancing the workload between technicians, the score function is:

$$Score = f_4(A,D)$$

a preferred mathematical relationship being:

$$Score = INT\left(\frac{A}{D}\right) \cdot 100$$

and for target 5, i.e. for optimising travel time, the score function is:

$$Score = f_5(E,C)$$

a preferred mathematical relationship being:

$$Score = INT\left(\frac{E}{E+C}\right) \cdot 100$$

where
A, C, D, E, H and J are statistics and functions of parameters; and
INT( ) is a function which calculates the integer of its own argument.

It is possible to calculate a score for multiple targets; in this case a score function $$F=F(\ldots,f_i,\ldots)$$

is defined, as a function of a plurality of score functions $f_i$ related to targets i specified in input.

As an example, a function $$F=F(f_2(J,H),f_4(A,D),f_5(E,C))$$

is defined, in order to calculate the Score for the achievement of "target 2 AND target 4 AND target 5", a preferred mathematical relationship being:

$$F = \begin{cases} 0 & \text{if } (f_2(J, H) = 0) \text{OR}(f_4(A, D) = 0) \text{OR}(f_5(E, C) = 0) \\ a \cdot f_2(J, H) + b \cdot f_4(A, D) + c \cdot f_5(E, C) & \text{otherwise} \end{cases}$$

where a+b+c=1 and a, b and c specify the weight attributed to target 2, 4, 5 respectively.

It is also possible to calculate a Score for the achievement of multiple targets with priorities, e.g. for the achievement of target 2 and target 4 as priority targets, and of target 5 with a score not under a defined threshold T.

In this case, a function F', $$F'=F'(f_2(J, H),f_4(A,D),f_5(E,C),T)$$

that fits these requirements is defined, a preferred mathematical relationship being:

$$F' = \begin{cases} 0 & \text{if } (f_2(J, H) = 0) \text{OR}(f_4(A, D) = 0) \text{OR}(f_5(E, C) < T) \\ a \cdot f_2(J, H) + b \cdot f_4(A, D) & \text{otherwise} \end{cases}$$

where a+b=1 and a, b specify the weight attributed to priority target 2, 4 respectively.

Work modalities of the scheduling algorithm depend on the configuration of its parameters, but also on the number of technicians with specific skills, available over the geographical area of interest for the WFM solution.

This is a matter of primary importance in the telecommunications context, because geographical areas are particularly extended, and they could reach the width of an entire country or state.

Considering, for instance, the context of Applicant's Italian network, there are about 15,000 technicians using the WFM system which typically deals with 40,000 Work Requests every day. In order to simplify the administration, technicians have been organized in 144 Working Centers, each one covering different geographical areas. Each area covered by a Working Centre is still broken down into smaller areas, named turfs and each technician may be assigned to one or more turfs.

Thus, in an alternative solution, the scheduling algorithm may generate different work plans by modifying the distribution of engineers over geographical areas/turfs, on the basis of the same workload.

The method described with reference to FIGS. 2 and 3 applies also in this case, in order to identify the best configuration of geographical areas and technicians.

Referring to FIG. 4, where the same reference numeral as in FIG. 2 have been used to indicate like or equivalent modules, a "Technicians/Geographical Area Configuration" module 60 takes the place of ALAN module 34 and makes available a graphical user-interface to modify the technicians or geographical area configuration. Module 60 interacts with the scheduling module 30 requiring execution of the scheduling algorithm.

Similarly to what-if analysis carried out with reference to FIGS. 2 and 3, a work plan produced by the scheduling algorithm is sent to the "Score Function" module 42, which, in presence of a target selected in input by an operator, calculates a "score" indicating the level of achievement of the target.

In a further alternative solution, the ALAN module and the Technicians/Geographical Area Configuration module may be implemented together in a more complex version of the system in order to take into account a wider range of tuning options.

Naturally, the principle of the invention remaining the same, the forms of embodiment may be varied widely with respect to those described and illustrated purely by way of non-limiting example, without thereby departing from the scope of protection of the present invention defined by the appended claims.

The invention claimed is:

1. A method of tuning a scheduling process for assigning tasks to resources of a workforce management system, the scheduling process being arranged for calculating a work plan or work plan data on the basis of resources availability and tasks to be carried out by said resources and as a function of predetermined scheduling parameters, comprising the following steps:
    acquiring scheduling parameters data, resources availability data and tasks data concerning tasks to be carried out;
    selectively modifying at least a predetermined subset of said scheduling parameters data;
    running the scheduling process on the basis of scheduling parameters, resources availability and task data, for each modified scheduling parameters data, to calculate respective work plans;
    acquiring target data including one or more targets which form the basis for the evaluation of work plans;
    applying a score function to each of said calculated work plans for calculating respective score values representative of the degree of achievement of said one or more targets by each calculated work plan; and
    selecting the work plan to be used by said workforce management system as the work plan being attributed a score value complying with a predetermined degree of achievement of one or more targets, wherein the score function is defined for calculating a respective value representative of the degree of achievement of multiple targets i, as a function of F of a plurality of score functions $f_i$ related to respective targets specified in input, according to the mathematical relationship:

$$F = \begin{cases} 0, & \text{if at least a function } f_i = 0 \\ \sum_i k_i \cdot f_i, & \text{otherwise} \end{cases}$$

where the overall sum of $k_i$ is equal to 1 and each $k_i$ specifies a weight attributed to the respective target.

2. The method according to claim 1, wherein the score function is selected from a plurality of functions based on said target data.

3. The method according to claim 1, wherein the score function is a function operating on a subset of work plan data, the method further comprises the step of associating to the score function an absolute integer value belonging to a predetermined limited range of values, a first end of which representing a condition of maximum deviation from target and a second end of which representing a condition of target substantially achieved.

4. The method according to claim 3, wherein said range of values is 0 to 100, wherein the lower limit represents a condition of maximum deviation from the target data, and the upper limit represents a condition of target data substantially achieved, and the work plan to be used by the workforce management system is the work plan having the highest score.

5. The method according to claim 1, wherein said target data comprises at least one of the following targets:
respecting appointments arranged with customers;
increasing the volume of tasks assigned for different activity types and services;
increasing the volume of backlog tasks assigned for different activity types and services;
balancing the workload between resources;
optimising resources travel time;
achieving Service Level Agreement for different activity types and services; and
assigning tasks of the most appropriate resource.

6. The method according to claim 5, wherein said subset of work plan data comprises data concerning resources, comprising at least one of the following:
number of resources employed by the scheduling;
total resource idle time;
total resource travelling time;
total number of available resources;
total resource working time;
and/or data concerning tasks, comprising at least one of the following:
total number of tasks assigned to resources by the algorithm;
total number of tasks with appointment assigned to resources by the algorithm;
total number of tasks with higher priority assigned to resources by the algorithm;
number of tasks assigned to resources by the algorithm for different type of activities and services; and
total number of tasks that the algorithm could assign.

7. The method according to claim 6, wherein the score function operates on the subset of work plan data by comparing a first numerical value associated with a first collection of said data with at least a second numerical value associated with a second collection of said data; and the score result is within a range of values extending from a lower limit corresponding to a condition of greatest distance between said first and second numerical value, to an upper limit corresponding to a condition of smallest distance or coincidence between said first and second numerical value.

8. The method according to claim 7, wherein the score function calculates the integer of the ratio between said first numerical value and said second numerical value.

9. The method according to claim 8, wherein, for a target of increasing the volume of tasks assigned for different activity types and services, the score function is:

$$\text{Score} = INT\left(\frac{\text{total number of tasks with higher priority assigned to resources}}{\text{total number of tasks that the algorithm could assign}}\right) \cdot 100.$$

10. The method according to claim 8, wherein, for a target of balancing the workload between resources, the score function is:

$$\text{Score} = INT\left(\frac{\text{number of resources employed by scheduling}}{\text{total number of available resources}}\right) \cdot 100.$$

11. The method according to claim 8, wherein, for a target of optimising travel time, the score function is:

$$\text{Score} = INT\left(\frac{\text{total resource working time}}{\text{total resources working time} + \text{total resource travelling time}}\right) \cdot 100.$$

12. The method according to claim 1, wherein parameters, resource and task data are retrieved from a database of said workforce management system.

13. The method according to claim 1, wherein parameters, resource and task data are retrieved from trace files produced by a Work Manager Server of said workforce management system at any execution of the scheduling algorithm.

14. The method according to claim 1, wherein said modified subset of scheduling parameters and said target data are input by an operator of said workforce management system.

15. The method according to claim 1, wherein said scheduling parameters comprise data concerning the distribution of resources over geographical areas, input by an operator of said workforce management system.

16. The method according to claim 1, wherein score results of said evaluation of work plans are displayed to an operator as a list of calculated scores.

17. A method of tuning a scheduling process for assigning tasks to resources of a workforce management system, the scheduling process being arranged for calculating a work plan or work plan data on the basis of resources availability and tasks to be carried out by said resources and as a function of predetermined scheduling parameters, comprising the following steps:
acquiring scheduling parameters data, resources availability data and tasks data concerning tasks to be carried out;
selectively modifying at least a predetermined subset of said scheduling parameters data;

running the scheduling process on the basis of scheduling parameters, resources availability and task data, for each modified scheduling parameters data, to calculate respective work plans;

acquiring target data including one or more targets which form the basis for the evaluation of work plans;

applying a score function to each of said calculated work plans for calculating respective score values representative of the degree of achievement of said one or more targets by each calculated work plan; and selecting the work plan to be used by said workforce management system as the work plan being attributed a score value complying with a predetermined degree of achievement of one or more targets, wherein the score function is defined for calculating a respective value representative of the degree of achievement of multiple targets i with priorities, and at least of a target j with a score not under a predetermined threshold T, as a function F' of a plurality of score functions $f_i$ related to respective targets specified in input and said threshold, according to the mathematical relationship:

$$F' = \begin{cases} 0, & \text{if at least a function } f_i = 0, \text{ or } f_j < T \\ \sum_i k_i \cdot f_i, & \text{otherwise} \end{cases}$$

where the overall sum of $k_i$ is equal to 1 and each $k_i$ specifies a weight attributed to the respective priority target.

18. A non-transitory computer readable storage medium encoded with a computer program product loadable into a memory of at least one computer and containing portions of software code for carrying out a method of tuning a task scheduling process according to any one of claims 1 to 11 and 17-16.

19. A system for tuning a task scheduling process, comprising:

at least one computer;

memory modules on said at least one computer for storing data concerning scheduling parameters, resources availability and tasks to be carried out;

a user-interface module including a parameter input unit for modifying data concerning said scheduling parameters, a target input unit for establishing one or more targets which form the basis for the evaluation of work plans, and a display for displaying the results of said evaluation of work plans; and a processing module for calculating work plans from said data concerning scheduling parameters, resources availability and tasks; and a score module associated with said processing module for assigning a score value to said calculated work plans according to a selected score function, which score value is related to the degree of achievement of said one or more targets, wherein the score function is defined for calculating a respective value representative of the degree of achievement of multiple targets i, as a function of F of a plurality of score functions $f_i$ related to respective targets specified in input, according to the mathematical relationship:

$$F = \begin{cases} 0, & \text{if at least a function } f_i = 0 \\ \sum_i k_i \cdot f_i, & \text{otherwise} \end{cases}$$

where the overall sum of $k_i$ is equal to 1 and each $k_i$ specifies a weight attributed to the respective target.

20. The system according to claim 19, wherein said task scheduling process is applied to a telecommunications network.

21. A system for tuning a task scheduling process, comprising:

at least one computer;

memory modules on said at least one computer for storing data concerning scheduling parameters, resources availability and tasks to be carried out;

a user-interface module including a parameter input unit for modifying data concerning said scheduling parameters, a target input unit for establishing one or more targets which form the basis for the evaluation of work plans, and a display for displaying the results of said evaluation of work plans; and a processing module for calculating work plans from said data concerning scheduling parameters, resources availability and tasks; and a score module associated with said processing module for assigning a score value to said calculated work plans according to a selected score function, which score value is related to the degree of achievement of said one or more targets wherein the score function is defined for calculating a respective value representative of the degree of achievement of multiple targets i with priorities, and at least of a target j with a score not under a predetermined threshold T, as a function F' of a plurality of score functions $f_i$ related to respective targets specified in input and said threshold, according to the mathematical relationship:

$$F = \begin{cases} 0, & \text{if at least a function } f_i = 0, \text{ or } f_j < T \\ \sum_i k_i \cdot f_i, & \text{otherwise} \end{cases}$$

where the overall sum of $k_i$ is equal to 1 and each $k_i$ specifies a weight attributed to the respective priority target.

* * * * *

UNITED STATES PATENT AND TRADEMARK OFFICE
CERTIFICATE OF CORRECTION

PATENT NO. : 7,984,441 B2  
APPLICATION NO. : 10/573829  
DATED : July 19, 2011  
INVENTOR(S) : Briccarello et al.

Page 1 of 1

It is certified that error appears in the above-identified patent and that said Letters Patent is hereby corrected as shown below:

Claim 18, column 11, lines 36-37, "any one of claims 1 to 11 and 17-16."  
should read --any one of claims 1 to 11 and 12-17.--.

Claim 21, column 12, lines 46-50,

"$$F = \begin{cases} 0, & \text{if at least a function } f_i = 0, \text{ or } f_j < T \\ \sum_i k_i \cdot f_i, & \text{otherwise} \end{cases}$$"

should read $$F' = \begin{cases} 0, & \text{if at least a function } f_i = 0, \text{ or } f_j < T \\ \sum_i k_i \cdot f_i, & \text{otherwise} \end{cases}$$

-- --.

Signed and Sealed this  
Nineteenth Day of March, 2013

Teresa Stanek Rea  
*Acting Director of the United States Patent and Trademark Office*